United States Patent [19]

Mueller

[11] 3,862,238
[45] Jan. 21, 1975

[54] 2-(2-BUTYNYLOXY)-PHENOL
[76] Inventor: Albrecht Mueller, 4 Pierstrasse, 6710 Frankenthal, Germany
[22] Filed: Dec. 4, 1970
[21] Appl. No.: 95,394

[30] Foreign Application Priority Data
Dec. 9, 1969  Germany............................ 1961623

[52] U.S. Cl...... 260/613 D, 260/479 R, 260/479 C, 260/482 C, 260/592, 424/300, 424/346
[51] Int. Cl............................................ C07c 43/20
[58] Field of Search...................... 260/613 D, 479 C

[56] References Cited
UNITED STATES PATENTS
3,202,573  8/1965  Haubein................................ 167/30
3,689,570  9/1972  Gradeff et al.................... 260/613 D FOREIGN PATENTS OR APPLICATIONS
937,897  9/1963  Great Britain.................. 260/613 D
1,923,914  11/1970  Germany........................ 260/613 D OTHER PUBLICATIONS
Tommila et al., Acta Chem. Scand. 17 (1963), 1957–1970.
Groggins, Unit Processes in Organic Synthesis, McGraw-Hill, New York (1952), p. 658.
Vyas et al., Org. Syn., coll. Vol. IV, John Wiley, New York, 1963, p. 836–838.
Houben–Weyl, Methoden Der Organischen Chemie, 4th Ed., G. Thiere, Stuttgart, Vol. VI/3, 1965, p. 54–57.
Doering et al., J.A.C.S. 72, pp. 5515–5518, 1950.
Hassall, Organic Reactions, Vol. IX, pp. 73–81, 87–94, 1957.
"Dimethyl Sulfoxide as a Reaction Solvent," Crown Zellerbach, p. 6, 1968.
Chem. Abst. 67, 32478m, 1967, (Netherlands 6516433).

*Primary Examiner*—Howard T. Mars
*Attorney, Agent, or Firm*—Johnston, Keil, Thompson & Shurtleff

[57] ABSTRACT

2-(2-butynyloxy)-phenol and a process for the production of the same by reacting 2-hydroxyacetophenone and a 2-halobutyne, oxidizing the resultant 2-(2-butynyloxy)-acetophenone and hydrolyzing the 2-(2-butynyloxy)-phenyl acetate obtained.

1 Claim, No Drawings

2-(2-BUTYNYLOXY)-PHENOL

The present invention relates to 2-(2-butynyloxy)-phenol or (2-(1-butyn-3-yloxy)-phenol having the formula (I)

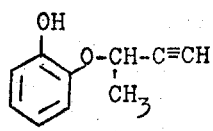

and a process for the production of this compound.

I have found that 2-(2-butynyloxy)-phenol is obtained in a notable sequence of reactions by a. reacting 2-hydroxyacetophenone with a 2-halobutyne to form 2-(2-butynyloxy)-acetophenone;
b. oxidizing the latter to 2-(2-butynyloxy)-phenyl acetate; and
c. hydrolyzing the acetate.

The starting compounds— 2-hydroxyacetophenone (II) and a 2-halobutyne (III) — are known compounds which are converted by methods known per se into 2-(2-butynyloxy)-acetophenone (see for example Houben-Weyl, "Methoden der organischen Chemie," 4th edition, volume 6/3, pages 54–57). Although the butynyl bromide and iodide are more reactive than the chloride, the cheaper chloride is preferred. In principle the fluoride may also be used but this does not offer any economic advantage.

Since hydrogen halide is formed in stage (a) it is advisable to use acid-binding agents such as alkali metal hydroxides and carbonates or amines such as triethylamine or pyridine, in equimolar amount to the acid liberated in order to promote a complete and rapid reaction. Although (II) and (III) react together in equivalent ratio to each other it is advantageous to use (III) in a molar excess of up to ten times to accelerate the reaction. Solvents or diluents do not have to be used, but it is preferred to carry out the reaction in a solvent such as methanol, dioxane, dimethylformamide or acetone; the reaction proceeds particularly well in water as a diluent with vigorous stirring. The reaction proceeds best at from 50° to 200°C; lower temperatures slow it down too much and at higher temperatures the formation of undesirable byproducts is promoted. It is generally sufficient to carry out the reaction at atmospheric pressure but it may be carried out at subatmospheric or superatmospheric pressure, for example from about 0.5 to 20 atmospheres.

The reaction mixture may be worked up into the new compound 2-(2-butynyloxy)-phenol (IV) by conventional methods, for example by fractional distillation, but the mixture may be subjected to the next stage (b) without isolating the compound (IV).

The oxidizing agent used for converting the ketone (IV) into the ester 2-(2-butynyloxy)-phenol acetate (V) is one which yields free radical oxygen, i.e., an inorganic or organic peroxy compound such as hydrogen peroxide, perbenzoic acid, persulfuric acid or monoperoxyphthalic acid and preferably peracetic acid. This reaction is advantageously carried out at from −10°C to +40°C in a solvent or diluent which is inert to the oxidizing agent, for example in chloroform or water. The method of carrying out such oxidations of ketones to esters is described in detail in "Organic Reactions," 9, 73, (1957) by C.H. Hassal.

The reaction mixture containing the new compound (V) is subjected, advantageously without isolating the compound (V), to stage (c), i.e. hydrolysis of (V) to (I). The hydrolysis may be catalyzed with acids such as sulfuric acid or phosphoric acid, but it is preferred to use basic reagents such as the hydroxides, carbonates or bicarbonates of alkali metals or alkaline earth metals, particularly sodium or potassium hydroxide or potassium carbonate, in stoichiometric amounts or in a slight excess (10 to 15%). Hydrolysis is particularly rapid and mild in dimethylsulfoxide as the solvent at 0° to 50°C so that it is worthwhile to isolate (V) previously. In other respects the hydrolysis may be carried out in a conventional way at from about 0° to 100°C. It is advantageous to carry out the hydrolysis under an atmospheric of a protective gas, for example nitrogen.

When the hydrolysis has been completed, the reaction mixture is made neutral, the water-soluble constituents are extracted with water, the organic phase containing the product is dried and the product is isolated by a conventional method, for example by evaporating the solvent at subatmospheric pressure and recrystallizing the crystals which form, or by vacuum distillation, or the solution is supplied to a further chemical reaction.

2-(2-butynyloxy)-phenol has insecticidal action and is valuable intermediate for organic syntheses, particularly for the production of pesticides which are obtained by reaction with methylcarbamoyl chlorides. 2-(2-butynyloxy)-phenyl N-methylcarbamate, for example, is highly effective against cockroaches, aphids, caterpillars, flies and mosquito larvae.

The following example illustrates the invention.

EXAMPLE a. 2-(2-butynyloxy)-acetophenone:

136 g (1.0 mole) of 2-hydroxyacetophenone, 97.6 g of 2-chlorobutyne (1.1 mole) and 40 g of sodium hydroxide (1.0 mole) are dissolved in 300 ml of methanol and the solution is heated under reflux for twenty-four hours. After the reaction mixture has cooled, inorganic salt is filtered off, the filtrate is concentrated, and the residue is taken up in 500 ml of water and extracted twice with methylene chloride. The combined extracts are washed with 200 ml of 5% caustic soda solution and then twice with water. After drying, the solvent is distilled off and crude 2-(2-butynyloxy)-acetophenone is obtained in a yield of 89.5%. Further purification is carried out by fractional vacuum distillation: boiling point 85° to 87°C at 0.005 mm Hg. Infrared spectrography, NMR spectrometry and elementary analysis all confirma expectations.

b. 2-(2-butynyloxy)-phenyl acetate:

40.0 g (0.21 mole) of 2-(2-butynyloxy)-acetophenone is dissolved in 800 ml of chloroform and while cooling 65 ml of 31% peracetic acid (0.28 mole) is added to this solution. During standing for three days at room temperature, about 90% of the acetophenone derivative changes into the phenyl acetate derivative, as can be confirmed by gas chromatographic analysis.

c. 2-(2-butynyloxy)-phenol:

The reaction mixture obtained according to (b) is freed from solvent and the residue (44 g of a dark oil) is dissolved in a mixture of 17 g of caustic sida solution, 200 ml of water and 20 ml of ethanol. The whole is heated for three hours under nitrogen at 40° to 50°C, then about 20% of the solvent is distilled off and the reaction mixture is neutralized with hydrochloric acid. The product of the process is isolated by extracting it three times with chloroform. The combined extracts are washed with sodium bicarbonate solution and water and then dried. The solvent is distilled off. The crude 2-(2-butynyloxy)-phenol is obtained in a yield of 95.8%. The boiling point is 135° to 137°C at 0.001 mm Hg. The boiling point is not particularly suitable for identification because of cyclization reactions which occur during distillation. The melting point is 53°C after recrystallization from a mixture of benzene and ligroin, the boiling point 60° to 80°C.

Mass spectrum, molecular weight and elementary analysis are all as expected.

I claim:

1. 2-(2-butynyloxy)-phenol.

* * * * *